May 15, 1945. J. F. SCHOTT ET AL 2,376,281
METHOD AND APPARATUS FOR PRODUCING LATEX FOAM
Filed Aug. 3, 1940
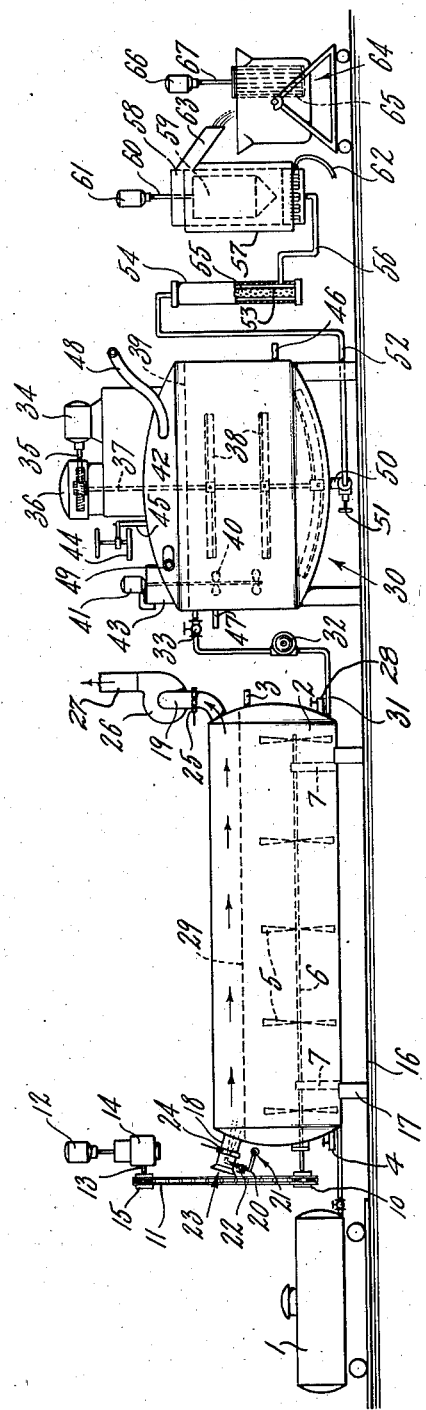
INVENTORS
JOHN F. SCHOTT
EUGENE A. LUXENBERGER
GEORGE W. BLAIR
BY
ATTORNEY Patented May 15, 1945

2,376,281

UNITED STATES PATENT OFFICE 2,376,281

METHOD AND APPARATUS FOR PRODUCING LATEX FOAM

John F. Schott, Eugene A. Luxenberger, and George W. Blair, Mishawaka, Ind., assignors to United States Rubber Company, New York, N. Y., a corporation of New Jersey Application August 3, 1940, Serial No. 350,466

8 Claims. (Cl. 260—723)

This invention relates to methods and apparatus for processing commercial latex, and particularly for producing a foam of the desired characteristics from a latex containing volatile stabilizing agents. The invention may, however, be employed to produce a foam or froth from latex which has been stabilized other than by addition of volatile ingredients.

The invention is particularly concerned with preliminary operations involved in the production of sponge rubber articles, such as cushions, mats, mattresses, and the like from latex. The invention is especially applicable to carrying out such a process on a large commercial scale, and one of its more important aspects is the provision of automatic apparatus which reduces handling and manipulation by operators to a minimum.

Commercially supplied latex is generally compounded with a volatile stabilizing ingredient, usually ammonia, which prevents coagulation thereof during shipment. As is well known in the art this treatment is necessary because of the tendency of latex in the natural liquid stage to coagulate when subjected to the drying action of air or heat. Because of this tendency, the commercial processing of latex must be carried out under carefully controlled conditions, care being taken that the temperature shall not rise excessively, the preferable conditions for stability being preferably in the neighborhood of 70° F. When manipulating latex, as when producing a foam therefrom, and when conveying the foam from one compounding or other operation to another, the practice in the past has been to use a batch system of operations.

These operations required constant exposure of large surfaces of the latex to air and particular care was necessary during every operation to prevent coagulation or "setting-up" with consequent spoiling of a batch before an opportunity was had to shape the liquid latex in the desired form in a final molding and setting operation, before vulcanizing of the article formed thereby. Such operations were slow, expensive, subject to considerable manual handling, and attended with loss in raw materials. Insofar as we are aware, attempts to carry out the processing stages in destabilizing and foaming and compounding latex by continuous methods or with continuous apparatus have previously been unsuccessful.

Our invention provides a commercially operable continuous process in which manual handling operations are reduced to a minimum. The system comprises generally a plurality of stations at which various manipulative and additive operations are carried out on successive volumes of latex flowing continuously through the apparatus. In general, the latex, starting with a raw supply, as from tank car, is prepared into a readily coagulable foam in condition for pouring into a mold, as follows. Latex is pumped from the tank car into a series of large storage tanks, each having, for example, a capacity of several thousand gallons. The latex is gently agitated within the tanks and the temperature thereof is kept substantially constant, for example, at around 75° F. Steam-saturated air is blown across the upper surface of the agitated latex to remove some of the ammonia therefrom, while stability of the latex is assisted by the maintenance of the latex at that temperature despite the partial removal of the stabilizing agent. The partially destabilized latex is then pumped through pipes to a mixing station, for example, a churn, wherein certain desired compounding ingredients are dispersed in the form of a paste or otherwise by means of a high speed mixer and preferably additionally by an agitating device during the churning operation. During this churning or mixing stage, further portions of the stabilizing ingredients are removed by blowing them off the upper surface of the latex. The latex is then introduced, under controlling pressure conditions into a foaming or frothing device. It is preferable that during this transfer from the mixing station to the frothing station the latex be cleaned, as by passing it through a strainer or other cleaning device. A specific example of a suitable frothing device for latex is described in the Keen Patent 2,295,740. This apparatus comprises, generally, means for continuously introducing latex at the desired pressure into a foaming chamber, introducing air into the latex in the form of bubbles to form a foam, and subjecting the foam to a foam-controlling operation in order to satisfy the desired consistency and density conditions. From the frothing apparatus the latex flows into a sensitizing apparatus in which further air is beaten into the foam and de-stabilizing or sensitizing ingredients are added thereto under controlled temperature and humidity conditions during agitation.

Once the latex foam has been brought to the desired consistency and density, the sensitizing ingredients such as zinc oxide and sodium silicofluoride, may be added in such proportions that the latex will coagulate after the lapse of a definite short period of time, as for example, within 5 minutes. It is imperative, therefore, that the thus prepared latex be poured or otherwise deposited into molds or other shaping devices within that period of time, otherwise it will set up and that particular volume or batch will be lost. It is possible with this invention to eliminate all batching operations throughout the entire process up until a particular quantity of latex is poured into a mold. When this procedure is employed the frothed latex foam is fed continuously from the storage tanks to the pouring station, without the necessity of trucking or other manual operations.

The drawing illustrates, more or less diagrammatically, apparatus in accordance with the invention.

Latex is pumped from a tank car 1 into a storage tank 2. The storage tank is provided with a jacket having an inlet 3 and an outlet 4 for the circulation of fluid for the maintenance of the proper temperature on the interior of the tank. A series of paddles 5 are secured to a shaft 6 extending longitudinally through the tank and rotatably supported by braces 7. One end of the shaft 6 extends through a packing 9 and carries a sprocket 10 through which the shaft and paddles may be driven by a chain 11. A motor 12 drives a shaft 13 through the gear box 14. This shaft 13 carries a sprocket 15 which drives the chain 11. The speed of the motor may be adjusted so that the paddles 5 may be driven slowly at the desired rate, for example, 3 R. P. M. The tank 2 may be of any desired shape, but is preferably a long, cylindrical tank horizontally supported on a floor 16 by stands 17.

Communicating with the ends of the tank, at the top portion thereof, are an air inlet 18 and an outlet vent 19. A feed line 20 enters the inlet 18 and is connected to a dry steam line 21 for control of the humidity within the tank, for example, above 95%. A valve 22 controls the amount of steam entering the inlet pipe 18. The open end 23 of the pipe 18 communicates with the air and permits passage of the air into the upper portion of the tank 2. Intermediate of the feed line 20 and the entrance to the pipe 18 into the tank is a gate 24 which controls the amount of air and steam which may be introduced into the tank.

The vent 19 likewise has a gate 25 to control the passage of gases into a suction blower 26 and thence to the atmosphere or a suitable chimney through an exit 27. The tank has a drain 28 to withdraw conditioned latex therefrom. By proper adjustment of the dry steam line 21 in relation to the air entering the pipe 18, the humidity of the air passing over the upper level 29 of latex within the tank may be controlled. This prevents premature drying of the latex. Likewise the temperature within the tank and of the latex is controlled through proper adjustment of the fluid entering the jacket at 3 and departing at 4. The passage of moist air from the pipe 18 through the upper portion of the tank, and out through the vent pipe 19 carries off a portion of the volatile stabilizing agent, such as ammonia. Since the paddles 5 are rotating the entire contents of the tank are constantly agitating thus presenting new quantities of latex at the upper surface of the tank 29 for deammoniation.

Adjustment of the various controls determines how much ammonia is removed from the latex within the tank, e. g. increasing flow of air above the surface 29 carries off ammonia at a greater rate. This may be accomplished by adjusting the speed of the suction blower and controlling the opening of the gate valves 24 and 25. As the latex becomes more and more free of the artificially stabilizing agent, the maintenance of proper humidity and temperature conditions becomes increasingly important in order to prevent premature coagulation. The agitation effected by the paddles 5 must also be properly controlled in order to prevent splattering of the latex against the walls of the tank which also would tend to induce premature coagulation. Once the desired amount of ammonia has been carried off and the proper consistency of the latex has been attained by agitation, latex may be withdrawn from the drain 28. This may take place intermittently or continuously as desired, but it is preferable to operate for a given length of time on a tank full of latex.

From the storage tank the latex is introduced to a churn 30, as through a pipe 31. The pressure necessary to induce the flow of latex from the tank to the churn may be furnished, for example, by a pump 32, or by gravity when the tank is mounted above the churn, or by other desired means such as constant head tanks. The rate of flow may be controlled in well known manner, as by adjusting the speed of the pump or adjusting the valve 33. The purpose of the churn is to further agitate the latex and remove more of the volatile stabilizing ingredient and to provide means for mixing in desired compounding ingredients such as vulcanizing ingredients, antioxidants, and other usual latex compounding compositions. While the latex is agitated within the churn the amount of air in contact therewith is controlled and the temperature, time, and speed of agitation likewise may be controlled. A motor 34 drives a shaft 35 connected through a gear box 36 to a vertical paddle shaft 37 supporting paddles 38 located below the latex level 39 within the churn. A high speed mixer 40 extends into the churn and comprises a shaft with propeller blades thereon and driven by a motor 41 mounted on the cover 42 of the churn. A chimney 43 is provided with a chimney cover 44 for access into the interior of the churn without removal of the entire cover 42. The chimney cover 44 may be swung into place on the pivot 45 mounted on the cover 42 so that the churn may be closed.

When the compounding ingredients are to be mixed into the latex within the churn, the chimney cover 44 is removed from the chimney and the ingredients, usually in the form of a paste, are dropped into the drum in the vicinity of the high speed mixer 40. These ingredients are thus dispersed into the latex and are thoroughly mixed by the combined action of the high speed mixer 40 and of the slower paddles 38. The mixer 40 may be located so that its shaft extends through the chimney 43 or preferably is adjacent thereto.

The churn may be provided with a jacket having an inlet 46 and an outlet 47 for the circulation of fluid at the proper temperature. The temperature may be automatically controlled during the churning operation by known control means, such as thermostatic means (not shown). Likewise, the period of mixing and agitation may be automatically controlled by timing means associated with the motor 34, in known manner. For a continuous supply of latex to the foaming apparatus, a plurality of churns may be alternately or concurrently employed so that while the properly compounded latex is being withdrawn from one churn the compounding and churning operation may be progressing in one or more other churns. After a churn has been emptied, a fresh supply of uncompounded but partially destabilized latex may be withdrawn from the storage tank 2. Appropriate valves are interposed in the pipe line 31 for proper control of flow between the storage tank and the churn, as at 28 and 33. An inlet pipe 48 and outlet pipe 49 may communicate with the cover 42 to provide an air flow humidified or not, as desired, above the upper surface 39 of the latex within the churn. Further deammoniation, that is, removal of the volatile stabilizer, may thus be effected as described in connection with the storage tank 2.

An outlet 50, controlled by a valve 51, leads to an exit pipe 52 which connects with a strainer 53 for cleansing of the latex. The strainer eliminates from the latex supply line any foreign particles or particles of coagulated latex which are present. The strainer may be of conventional form such as a casing 54 and a perforated cartridge 55 into which the latex is fed. A pipe 56 leads from the strainer to feed pure, clear latex to the foaming unit. As described above, the foaming apparatus 57 may be of the type disclosed in the Patent 2,259,740. In this construction a cylinder 58 encloses a rotor 59 supported by a shaft 60 and driven by a motor 61. Latex is introduced from the pipe 56 into the bottom of the cylinder 58 and air from a supply line 62 is bubbled into the latex to form a coarse foam. The preliminary foam thus produced is smoothed out by a shearing operation, i. e. by passing between the exterior surface of the rotor 59 and the interior of the cylinder 58 and is withdrawn through a chute 63 whence the latex foam passes into a sensitizing unit 64. Other forms of whips may be used to form the latex foam, but continuous operation is preferable.

The sensitizing unit comprises a whip 65 driven by a motor 66 and supported by a shaft 67 which serves to further whip the latex foam, thereby maintaining the size and distribution of the bubbles, and also provides means for mixing and distributing sensitizing ingredients into the foam. These ingredients may comprise known delayed coagulants or heat-sensitizing compounds known in the latex art. From the sensitizing unit the completely prepared latex foam, which has been gradually de-stabilized through the process, is poured into molds, to be set in final shape before vulcanization.

The present process and apparatus provide a continuous and commercially practicable method for continuously producing a large number of vulcanized sponge rubber articles of substantially identical rubber consistency. The conditions are so controlled that the latex before foaming is uniform and during the various stages increasing quantities of volatile stabilizing ingredients are removed. Thus when the latex is ready to be foamed by the foaming unit 57 it is sufficiently stable to prevent setting up but has been sufficiently de-stabilized so that the effect of the added sensitizing ingredients is not nullified. Throughout the entire process the amount of air coming in contact with the latex is carefully controlled so as to avoid premature drying and thickening.

While we have shown a certain present preferred embodiment of the invention, it is to be understood that it may be otherwise embodied and practiced within the spirit of this description and within the scope of the appended claims.

Having thus described our invention, what we claim and desire to protect by Letters Patent is:

1. The continuous method of processing latex containing a stabilizing agent which consists in removing at least a part of the stabilizing agent while maintaining the latex at a stable temperature, conveying the latex in the absence of air to a mixing station, mixing compounding ingredients into the latex at the mixing station while controlling the exposure of the latex to air to prevent premature coagulation, and transferring the compounded latex in the absence of air to a frothing station.

2. Apparatus for processing latex containing a volatile stabilizing agent comprising in combination a closed storage tank, means for removing stabilizing agent from the latex in the tank, means for maintaining the latex in the tank at a stable temperature, a closed mixing container, a closed conduit for conveying latex in the absence of air from the tank to the mixing container, means for mixing compounding ingredients into the latex in the container, means for controlling the exposure of the latex to air in the mixing container to prevent premature coagulation of the latex, foaming means, and a closed conduit for conducting the compounded latex from the mixing container to the foaming means.

3. Apparatus for processing latex containing a volatile stabilizing agent which comprises a closed storage container, a closed mixing container, a foaming container, a closed passage connecting said containers in said order, means for continuously transferring latex from container to container and means for maintaining the latex at a stable temperature to prevent premature coagulation.

4. Apparatus for processing latex containing a volatile stabilizing agent which comprises a closed storage container, a closed mixing container, a foaming container, closed passages connecting said containers in said order, means for continuously transferring latex from container to container, means for maintaining the latex at a stable temperature and means for controlling the humidity in the storage container and mixing container to prevent premature coagulation of the latex.

5. In the method of processing latex containing a volatile stabilizing agent, the steps comprising confining a substantial volume of latex while maintaining the latex at a stabilizing temperature and while agitating the latex and blowing air over the surface of the latex to carry away the stabilizing agent set free by the agitation.

6. In the method of processing latex containing a volatile stabilizing agent, steps comprising confining a substantial volume of latex, maintaining the latex at a stabilizing temperature, gently agitating the latex while flowing air saturated with water vapor over the surface of the latex to carry away the stabilizing agent set free by the agitation.

7. The continuous method of processing latex containing a stabilizing agent which consists in removing at least a part of the stabilizing agent while maintaining the latex at a stable temperature, conveying the latex in the absence of air to a mixing station, mixing compounding ingredients into the latex at the mixing station while controlling the temperature of the latex and the exposure of the latex to air to prevent premature coagulation and transferring the compounded latex in the absence of air to a frothing station.

8. The method of continuously processing latex containing a stabilizing agent which consists in removing a part of the stabilizing agent while maintaining the latex at a stable temperature, conveying the latex in the absence of air to a mixing station, mixing compounding ingredients into the latex at the mixing station while removing remaining stabilizing agent therefrom and while controlling the exposure of the latex to air to prevent premature coagulation, and transferring the compounded latex in the absence of air to a frothing station.

JOHN F. SCHOTT.
EUGENE A. LUXENBERGER.
GEORGE W. BLAIR.